United States Patent [19]
Ozaki et al.

[11] Patent Number: 4,903,122
[45] Date of Patent: Feb. 20, 1990

[54] SOLID-STATE COLOR IMAGING APPARATUS FOR EXTENDED DEFINITION TELEVISION (EDTV)

[75] Inventors: Toshifumi Ozaki, Koganei; Naoki Ozawa, Akishima; Shinya Ohba, Kanagawa; Itaru Mimura, Hachiouji, all of Japan

[73] Assignee: Hitachi, Ltd., Tokyo, Japan

[21] Appl. No.: 142,919

[22] Filed: Jan. 12, 1988

[30] Foreign Application Priority Data

Jan. 28, 1987 [JP] Japan .................................. 62-16060

[51] Int. Cl.⁴ ........................ H04N 9/077; H04N 9/07
[52] U.S. Cl. ......................................... 358/48; 358/44
[58] Field of Search ........................ 358/41, 43, 44, 48

[56] References Cited

U.S. PATENT DOCUMENTS 4,246,601  1/1981  Sato et al. ............................. 358/44
4,714,955  12/1987  Nishimura et al. .................. 358/48

FOREIGN PATENT DOCUMENTS 0113462  7/1984  European Pat. Off. .............. 358/44
59-288  1/1984  Japan ................................... 358/48

OTHER PUBLICATIONS

Masakazu Aoki et al., "MOS Color Imaging Device", 1980 *IEEE International Solid-State Circuits Conference Digest of Technical Papers*, pp. 26–27, Feb. 13, 1980.

Ozawa Naoki et al., *National Convention Record of the Institute of Television Engineers of Japan*, 4–13 (1980), pp. 83–84.

Hishimuya Tashimichi et al., "LSI's for CCD Color Camera Using R/B Line Alternating System", *Technical Papers of the Institute of Television Engineers of Japan*, vol. 7, No. 41 (1984, 2), pp. 1–6.

Takahiko Fukinuki et al., "Extended Definition TV Fully Compatible with Existing Standards", *IEEE Transactions on Communications*, vol. COM-32, No. 8, Aug. 1984, pp. 948–953.

Takahiko Fukinuki et al., "Experiments on Proposed Extended-Definition TV with Full NTSC Compatibility", *SMPTE Journal*, Oct. 1984, pp. 923–929.

Akiyoshi Kohno et al., "A Line Sequential Complete Color Difference Signal Method for Single Chip Color Video Camera", *Technical Papers of the Institute of Television Engineers of Japan*, vol. 8, No. 44, (1985, 2), pp. 1–6.

Kenneth A. Parulski, "Color Filters and Processing Alternatives for One-Chip Cameras", *IEEE Transactions on Electron Devices*, vol. ED-32, No. 8, Aug. 1985, pp. 1381–1389.

Haruhisa Ando et al., "Design Consideration and Performance of a New MOS Imaging Device", *IEEE Transactions on Electron Devices*, vol. ED-32, No. 8, Aug. 1985, pp. 1484–1489.

(List continued on next page.)

Primary Examiner—James J. Groody
Assistant Examiner—Randall S. Svihla
Attorney, Agent, or Firm—Antonelli, Terry & Wands

[57] ABSTRACT

A high resolution solid-state color imaging apparatus having two-dimensionally disposed photoelectric sensors are arranged in rows and columns each having a color spectral responsivity characteristic such as by employing color filters. Each of the photoelectric sensors is scanned so as to obtain an intensity signal with respect to each row of each field, and wherein scanning of each field is for the same number of rows as that of each frame. Intensity signals are obtained only by the scanned output of each row. Additional intensity signals equal to half the number of said first mentioned intensity signals are obtained by a 2:1 subsampling of bandwidth-restricted signals by a filter along the vertical temporal frequency, thereby realizing high vertical resolution by the photoelectric image sensors of conventional row numbers and having compatibility with a conventional NTSC system and, furthermore, eliminating aliasing distortion.

7 Claims, 7 Drawing Sheets

OTHER PUBLICATIONS

Yasuhiro Hirano et al., "Fully Compatible Extended Definition TV-Part 2, Experimental Extended-Definition TV System with Motion-Adaptive Processing", *Journal of the Institute of Television Engineers of Japan*, vol. 39, No. 10, 1985, pp. 891-897.

Taiji Nishiawa, "Frame Rate Conversion Techniques for Television Signals", *Journal of the Institute of Television Engineers of Japan*, vol. 40, No. 3, 1986, pp. 154-161.

Toshio Miyazawa et al., "TSL (Transversal Signal Line) Solid State Imager", *National Convention Record of the Institute of Television Engineers of Japan*, 3-8 (1986), pp. 59-60.

Takuya Imaide et al., "Color Camera with Horizontal-Readout MOS Imager", *Technical Papers of the Institute of Television Engineers of Japan*, vol. 9, No. 45 (1986, 2), pp. 13-18.

Masaaki Nakai et al., "An Interline CCD Imager with Double-Density Vertical Registers", *National Convention Record of the Institute of Television Engineers of Japan*, 4-12 (1987), pp. 85-86.

FIG. 7
(PRIOR ART)
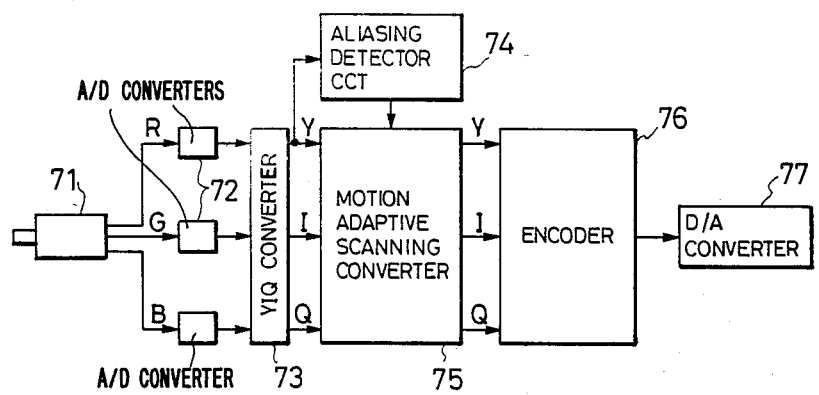
FIG. 9
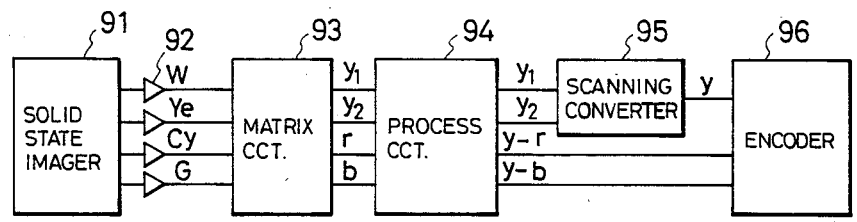
FIG. 10
| W | G | W | G |
|---|---|---|---|
| Cy | Ye | Cy | Ye |
| W | G | W | G |
| Cy | Ye | Cy | Ye |
FIG. 11
|       | W | Ye   | Cy   | G    |
|-------|---|------|------|------|
| $y_1$ | 1 | 0    | 0    | 1.4  |
| $y_2$ | 0 | 1    | 1.4  | 0    |
| r     | 1 | 0.8  | -0.7 | -1   |
| b     | 1 | -0.8 | 1.6  | -1.5 |

| R | G | B | R | G | B |
|---|---|---|---|---|---|
| R | G | B | R | G | B |
| R | G | B | R | G | B |
| R | G | B | R | G | B |

| G | R | G | R |
|---|---|---|---|
| B | G | B | G |
| G | R | G | R |
| B | G | B | G |

SOLID-STATE COLOR IMAGING APPARATUS FOR EXTENDED DEFINITION TELEVISION (EDTV)

BACKGROUND OF THE INVENTION

1. Field of the Invention

This invention relates to a solid-state imaging apparatus and, more particularly, to a single-chip color solid-state imaging apparatus which will be suitable for a novel television system for improving vertical resolution.

2. Description of the Prior Art

Interlaced scanning is adopted for the present standard television system, i.e. the NTSC system, of Japan and U.S.A. FIG. 1 of the accompanying drawings shows the principle of interlaced scanning. In the drawing, the ordinate represents the axis in the direction of vertical space in a television frame and the abscissa represents a time axis. One plane represents one field and symbol 1 does a scanning line. Each of the frames, which are transmitted and received 30 times per second, consists of two fields. Each field is scanned by scanning every other scanning line. Namely, odd-numbered scanning lines $l_{11}, l_{13}, \ldots, l_{1,263}$ are transmitted and received in the first field and even-numbered scanning lines $l_{22}, l_{24}, \ldots, l_{2,262}$ are transmitted and received in the second field. The first and second fields together constitute one frame. When this interlaced scanning is employed, a field frequency becomes 60 Hz even if a frame frequency is 30 Hz and this provides the effect as if the number of frames was 60 per second for human eyes, wherein flicker is eliminated. Since human eyes are characterized as having low-pass characteristics with respect to time, the number of scanning lines looks as if 525 scanning lines existed on a TV frame, though the number of scanning lines per 1/60 second is 262.5. Accordingly, the transmission band can be halved.

In order to accomplish interlaced scanning as described above, any of the following three signal readout methods shown in FIGS. 2(a) to 2(c) may be executed in a solid-state image sensing device. In the drawings, each square represents one pixel, the solid line represents the readout sequence of pixels of the first field and the broken line represents the read sequence of pixels of the second field. FIG. 2(a) shows frame storage one-row readout wherein alternate rows corresponding to each field are sequentially read out row-by-row. The light storage time of each pixel in such a read out method is one frame time wherein image lag develops. FIG. 2(b) shows field store two-row mixed readout wherein two vertical rows are mixed inside the image sensing device and the combination of the mixed two rows is alternately changed in each field. FIG. 2(c) shows field store two-row simultaneous readout wherein two vertical rows are not mixed but are simultaneously readout and their combination is changed in each field. In accordance with the signal readout methods shown in FIGS. 2(b) and 2(c) each pixel is readout once per 1/60 second.

A single-chip color solid-state imaging apparatus is one that obtains color television signals by use of one solid-state image sensing device executing any one of the signal readout methods described above. A filter having different spectral responsivity is disposed on the image sensing device for each pixel and signals in accordance with chrominance signals of a scene are sequentially outputted. A luminance signal providing data as to the brightness of the scene and a chrominance signal providing data on the color of the scene can be obtained by signal-processing this output. Various methods of disposing the color filters and various signal processing methods are available with respect to the three signal readout methods described above, as described, for example, in "IEEE Trans. Electron Devices", Vol. ED-32, pp. 1381-1389, Aug., 1985. As to the device for frame store one-row read out, refer to "Tech. Papers, Inst. Telev. Eng. Japan", Vol. 7, No. 41, pp. 1-6, (1984, 2). Refer also to "Tech. Papers, Inst. Telev. Eng. Japan", Vol. 8, No. 44, (1985, 2) pp. 1-6 for the device for field store two-row mixed readout, and "National Convention Rec. Inst. TV Eng. Japan", 4-13 (1980), pp. 83-84 as well as "Tech. Papers, Inst. Telev. Eng. Japan", Vol. 9, No. 45 (1986, 2) for the device for field store two-row simultaneous readout.

An example of a single-chip color solid-state imaging apparatus using a field store two-row simultaneous readout device will be described hereby with reference to FIGS. 3 and 4. FIG. 3 shows the circuit construction of a TSL solid-state image sensing device and the filter arrangement described in "National Convention Rec. Inst. TV Eng. Japan", 3-8 (1986), pp. 59-60. FIG. 4 is a block diagram of the signal processing system of the single-chip color solid-state imaging apparatus using the device shown in FIG. 3.

In FIG. 3, reference numeral 31 represents a photodiode for photoelectric conversion; 32 and 33 are vertical and horizontal shift registers for generating pulses for reading out sequentially signal charges of each photodiode, respectively; 34 is an interlace circuit for changing the combination of two rows that are to be readout simultaneously; 35 is a horizontal switch (or gate) that is opened and closed by the pulse of the horizontal shift register; 36 is a vertical switch (or gate) that is opened and closed by the pulse of the vertical shift register; 37 is a row switch (gate) for selecting the rows to be readout; 38 is a horizontal signal line; 39 is a vertical signal line; and 40 and 41 are reset drain and reset switch (or gate) for eliminating unnecessary charge in the horizontal signal line before signal readout. Symbols W, G, Cy, and Ye represent filters having white, green, cyan and yellow spectral responsivity disposed on each pixel, respectively.

Hereinafter, the operation of this device will be described. In the horizontal blanking period, the reset switch (gate) 41 opens, the unnecessary charges in all the horizontal signal lines are discharged to the reset drain 40 and then the reset switch (gate) 41 closes. Thereafter, the vertical switch (gate) 36 and the row switch (gate) 37 of two rows selected by the vertical shift register and the interlace circuit open. In this state, the horizontal shift register 33 opens and closes sequentially the horizontal switches and the signal charges of each pixel on which the Ⓦ, Ⓖ, Ⓒy and Ⓨe filters are disposed are outputted to the independent horizontal signal line 38 and vertical signal line 39.

In FIG. 4, reference numeral 42 represents the solid-state image sensing device shown in FIG. 3; 43 represents four preamplifiers for amplifying four output currents of the device; 44 represents a matrix circuit for providing the luminance signals y and the chrominance signals, r, g, b at the output thereof; 45 represents a process circuit for outputting the luminance signal y and color difference signals y-r, y-b from the y, r, g and b signals; and 46 represents an encoder for generating NTSC composite signals.

Hereinafter, the operation of this apparatus will be described. The chrominance signals W, Cy, Ye and G outputted from the solid-state image sensing device 42 are amplified by the corresponding four pre-amplifiers 43, respectively. The outputs of the amplifiers are respectively transmitted to the matrix circuit 44 which provides multiply/add signal processing and conversion resulting in the y, r, g or b signals in accordance with the following equation (1):

$$y = W + Ye + 1.4Cy + 1.4G$$
$$r = W + 0.8Ye - 0.7Cy - G$$
$$g = -W + 0.4Cy + 2.2G$$
$$b = W - 0.8Yi + 1.6Cy - 1.5G$$
(1)

After being subjected to white compression, gamma ($\gamma$) correction, blanking addition, white balance and automatic gain control by the process circuit 45, the y, r, g and b signals are converted to the luminance signals y and the color difference signals y-r, y-b. Thereafter, each signal is subjected to quadrature modulation by the encoder 46 into the NTSC composite signal, that is, the output signal of this apparatus.

In the conventional apparatus described above, the luminance signals y and the color difference signals y-r, y-b of one scanning line are generated from the signals of two rows that are read out in one horizontal scanning period of the solid-state image sensing device, as can be seen clearly from the filter configuration shown in FIG. 3 and from the matrix circuit of the equation (1). In the solid-state image sensing devices for frame store one-row readout and for field store mixed readout, on the other hand, the color difference signals y-r, y-b are so-called line sequential signals wherein the y-r and y-b signals are alternately obtained by every horizontal scanning, but the luminance signal of one scanning line is generated from the signal or signals of one or two rows that are read out in one horizontal scanning period of the solid-state image sensing device.

Meanwhile, an EDTV system capable of transmission and reception of pictures having higher fineness by modifying the present television system has been proposed. An example of such an apparatus is disclosed in "J. Inst. Telev. Eng. Japan", Vol. 39, No. 10 (1985) pp. 891-897, Vol. 40, No. 3 (1986) pp. 154-161, "IEEE Trans. COM-32, 8, pp. 948-953 (Aug., 1984) and "SMPTE J.", 93, 10, pp. 923-929 (Oct., 1984). This system is directed primarily to improve effective vertical resolution by changing the scanning system of a television transmitter/receiver from interlaced scanning to sequential scanning. Hereinafter, the principle of improving vertical resolution by the change of scanning line disclosed in the above-mentioned literatures will be described with reference to FIGS. 5 to 8.

FIG. 5 shows a sampling frequency in the time-spatial frequency region of interlaced scanning and signal components of a picture when the image of a still picture is taken; FIG. 6 shows scanning line interpolation process for converting interlaced scanning, which is effected on the receiver side, to sequential scanning and characteristics of a scanning line interpolation filter; FIG. 7 is a block diagram of an EDTV color imaging apparatus for converting sequential scanning, which is effected on the transmission side, to interlaced scanning; and FIG. 8 is a block diagram of a motion-adaptive scanning converter and shows the characteristics of a pre-filter.

In interlaced scanning shown in FIG. 1, there is a time difference of 1/30 second from display of $l_{22}$ to display of $l_{42}$, for example, so that $l_{31}$ and $l_{33}$ displayed during this period interfere with each other visually, interline flicker develops and vertical resolution drops as a consequence. FIG. 5 illustrates this phenomenon in a sampling frequency region by regarding scanning as sampling in the time and spatial regions. In FIG. 5, the abscissa represents the vertical spatial frequency, the ordinate is the temporal frequency, black circles A-D are sampling frequency, the region S is the signal component of the picture when the image of a still picture is taken and $S_1$ to $S_4$ are sideband components generated by scanning.

Interline flicker is generated by the components of the region $S_4$. The signal spectrum has expansion in the time-spatial frequency regions but in this case, too, the sideband components are generated around the point C, thereby causing disturbance.

Picture degradation can be removed by inserting a scanning line interpolation filter for removing the sideband components generated around the sampling frequency represented by the point C in FIG. 5 on the receiver side. FIG. 6 shows the principle of improving picture quality by this interpolation filter. FIG. 6(a) shows the scanning line structure of the receiver after insertion of this interpolation filter and its interpolation process. In the same way as in FIG. 1, the ordinate represents the axis in the vertical direction of the television frame and the abscissa represents the time axis. One plane represents one field and symbol 1 represents the scanning line. Symbol X represents the scanning lines that are not transmitted while the scanning lines with black point ● represent the scanning lines that are transmitted. The broken line arrow represents the interpolation process at the still portion and one-dot-chain line represents the interpolation process at a moving picture portion. FIG. 6(b) shows the characteristics of such an interpolation filter. The abscissa represents the vertical spatial frequency, the ordinate represents the temporal frequency and black circles A to D correspond to the sampling frequency at the time of interlaced scanning. The hatched side is a passing area with symbol ⓐ representing the characteristics for the still picture ⓑ the characteristics for the moving picture and ⓒ the characteristics for the motion which is not so great.

Hereinafter, the interpolation process will be described. Insertion of the interpolation filter corresponds to conversion of interlaced scanning to sequential scanning as shown in FIG. 6(a), and data of the scanning lines X which are not transmitted are produced from the data of the scanning lines with black point ● which are transmitted. This process is made by interpolation using the data of the previous field. In other words, as shown in FIG. 6(a), $l_{32}$ is interpolated by $l_{22}$ of the previous field, for example. The characteristics of the interpolation filter at this time correspond to symbol ⓐ in FIG. 6(b). However, this interpolation process involves the problems that interdigitated picture degradation occurs at a profile portion with respect to the motion in the horizontal direction and smoothness of motion is insufficient in the vertical direction. As to the moving pictures, therefore, interpolation is started from the upper and lower scanning lines in a given field. In other words, as shown in FIG. 6(a), $l_{32}$ is interpolated by upper and lower scanning lines $l_{31}$ and $l_{33}$, for example. The characteristics of the interpolation filter at this time correspond to symbol ⓑ in FIG. 6(b). Furthermore, in order to make smooth switching between the still and moving pictures, the data of the previous field and the data of the upper and lower scanning lines in a given field are used in combination. The characteristics of the interpolation filter at this time correspond to symbol ⓒ in FIG. 6(b). The sideband components around the point C that cause interline flicker can be eliminated by inserting the interpolation filter described above, as shown in FIG. 6(b). Incidentally, though vertical resolution of the moving picture gets deteriorated according to this system, human eyes have characteristics such that resolution drops with respect to the moving picture. Therefore, this is not a critical problem at all.

Now, since the non-interlace arrangement is employed on the receiver side as described above, the problem of interline flicker can be solved, but the following two problems remain to be solved. First of all, in existing cameras for interlaced scanning, the width corresponding to two scanning lines in the frame is taken out in each field in order to prevent image lag. As a result, the interpolated scanning line from the previous field contains the same data half by half in the upper and lower scanning lines so that resolution characteristics in the vertical direction get deteriorated as much. Secondly, it is difficult to judge motion by the interlaced scanning signal by use of the existing cameras and hence the motion-adaptive processing described above cannot be effected so easily. To solve these two problems, there has been made a proposal according to which the camera, too, makes sequential scanning and this sequential scanning is converted to interlaced scanning. Hereinafter, a prior art example of the EDTV color imaging apparatus employing this system will be described. FIG. 7 is a block diagram of the EDTV color imaging apparatus and FIG. 8 shows a block diagram of its motion-adaptive scanning converter and the characteristics of a pre-filter.

In FIG. 7, reference numeral 71 represents a three-tube color camera for sequential scanning; 72 is an A/D converter for digital signal processing; 73 is a YIQ converter for converting the RGB signals to the luminance signal Y and the color signals I, Q (which are equal to R-Y and B-Y unless their bandwidth is dealt with s strictly); 74 is an aliasing detector circuit for detecting the motion; 75 is a motion-adaptive scanning converter for converting the YIQ signals from sequential scanning to interlaced scanning; 76 is an encoder for multiplexing the YIQ signals into the NTSC signals; and 77 is a D/A converter for converting the digital NTSC signals to analog signals.

FIG. 8(a) is a block diagram of the scanning converter, wherein reference numeral 74 represents an aliasing detector circuit having the characteristics such as shown in FIG. 8(b); 81 is a time-spatial filter exhibiting the characteristics (C-1) when there is no output of the aliasing detector circuit and the characteristics (C-2) when there is, as shown in FIG. 8(b); 82 is a time-spatial filter exhibiting the characteristics shown in FIG. 8(d); and 83 is a switch for 2:1 sub-sampling. FIGS. 8(b) to 8(d) each show the characteristics of the time-spatial filter. In the diagrams, the abscissa represents the vertical spatial frequency and the ordinate represents the temporal frequency. The hatched portion represents a passing band.

Hereinafter, the operation of this apparatus will be described. The optical signal is analyzed by a prism inside the three-tube color camera 71 and each of the R, G, B signals is subjected to photoelectric conversion of the camera tube and scanned sequentially by 525 scanning lines per 1/60 second to provide each output. After which each of the R, G, B signals is converted to a digital signal by the A/D convertor 72 at a speed which is eight times that of the color sub-carrier and turned to the luminance signal Y and the chrominance signals I, Q by the YIQ converter. The YIQ signal is thinned out per each scanning line by the motion-adaptive scanning converter 75 and converted to interlaced scanning. In order to avoid aliasing distortion due to sub-sampling in this instance, each signal passes through the pre-filter having the characteristics as shown in FIG. 8. In other words, when no output of the aliasing detector circuit 74 exists (corresponding to the still picture) band limitation is not applied to the luminance signal and when this output exists (corresponding to the moving picture), band limitation shown in FIG. 8 C-2 is effected. Accordingly, the drop of vertical resolution attributable to the characteristics of time-spatial filter is eliminated in the still picture and resolution can be improved. On the other hand, since the resolution characteristics of the visual sense to the color difference signals are much lower than those of the luminance signal, no aliasing distortion occurs in the chrominance signal under the all-time band limitation of FIG. 8(d). The signal converted to interlaced scanning is turned to the NTSC signal by the encoder 76 and thereafter to the output signal through the D/A converter 77.

According to the prior art example described above, the data of the scanning line interpolated between the fields on the receiver side do not at all have the same portion as the data of the scanning lines of the present field in the case of the still picture, and resolution of 525 scanning lines, as such, can be accomplished. The sampling frequency of the point C in FIG. 5 is eliminated by sequential scanning and motion can be detected easily by the time-spatial filter.

As can be understood from the operation of the adaptive type scanning converter, it is only the luminance signal that needs 525 scanning lines per 1/60 second in order to accomplish the EDTV color imaging apparatus and the chrominance signal components need only 525/2 scanning lines for the chrominance signal is not used for the purpose of motion detection and band limitation of 525/4 lines is always effected.

The conventional single-chip color solid-state imaging apparatus described above does not take sequential scanning, necessary for the EDTV system, into consideration and hence involves the problem that the number of pixels in the vertical direction of the solid-state image sensing device must be doubled in order to accomplish the EDTV single-chip color imaging apparatus by the conventional technique for the number of scanning lines per field in sequential scanning is twice the number of scanning lines per field in interlaced scanning. The increase in the number of pixels in the vertical direction causes a high level of integrated circuit technology to be needed for fabricating the device and S/N (signal to noise ratio) drops due to the drop of the fill factor (or the ratio of photosensitive area) of the device. For these reasons, it has been extremely difficult to accomplish the EDTV single-chip color device.

SUMMARY OF THE INVENTION

It is therefore a primary object of the present invention to accomplish an imaging apparatus which uses a solid-state image sensing device having the same number of pixels in the vertical direction as the prior art device and which can provide sequential scanning necessary for the EDTV system.

A solid-state color imaging apparatus according to the present invention having a plurality of photoelectric conversion means disposed two-dimensionally in rows and columns and wherein each photoelectric conversion means has color spectral responsivity characteristic, the invention comprising: scanning means for reading out the signal of each of the photoelectric conversion means as an independent signal during each field, and for scanning with respect to each field the same number of rows as that of each frame; second means for obtaining first intensity signals of the number of rows corresponding to each frame, each of the first intensity signals corresponds to an intensity signal of a respective row, and is obtained only by the output of each row; third means for obtaining second intensity signals corresponding to half the number of first intensity signals obtaining by processing said first intensity signals; and fourth means for encoding said second intensity signals.

BRIEF DESCRIPTION OF THE DRAWINGS

FIG. 7 shows a block diagram of an EDTV color imaging apparatus for converting sequential scanning, which is effected on the side of a transmitter, to interlaced scanning;

FIG. 9 shows the structure of one embodiment of the present invention;

FIG. 10 shows the filter configuration of the embodiment shown in FIG. 9;

FIG. 11 shows a matrix coefficient for generating luminance signals and chrominance signals from the output signal of the device in the embodiment shown in FIG. 9;

DETAILED DESCRIPTION OF THE PREFERRED EMBODIMENTS

The scanning function provided to a single-chip color solid-state image sensing device reads out the signal charges of all pixels for each field independently without mixing them inside the device. At this time, color filters disposed on the device are formed in such a manner that a luminance signal can be obtained for each row. A signal process circuit outside the device separates the luminance signal from the output of the device for each row. Accordingly, luminance signal components, which have been obtained conventionally one each for two rows in each field, can be obtained one each for one row, and the sequential scanning signals necessary for the EDTV system can be obtained from the solid-state image sensing device having the same number of pixels in the vertical direction as the prior art device.

The foregoing and other objects, advantages, manner of operation and novel features of the present invention will be understood from the following detailed description when read in connection with the accompanying drawings.

Hereinafter, one embodiment of the present invention will be described with reference to FIGS. 9 to 11.

FIG. 9 is a structural view of the solid-state imaging apparatus of the present invention, FIG. 10 shows a filter configuration on a solid-state image sensing device of this embodiment and FIG. 11 shows matrix coefficients for generating the luminance signals and the chrominance signals from the signal output of each line of the solid-state image sensing device.

Figure 1:
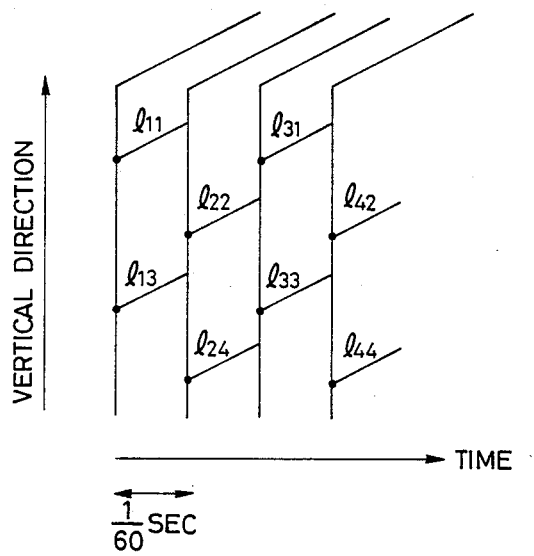
FIG. 1 shows the principle of interlaced scanning in a prior art system.
Figure 2A:
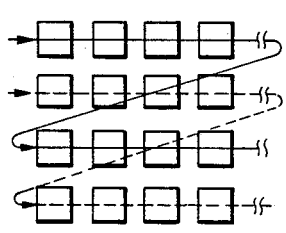
FIGS. 2(a)-2(c) show three signal readout methods of a solid-state image sensing device for accomplishing interlaced scanning in the conventional system.
Figure 2B:
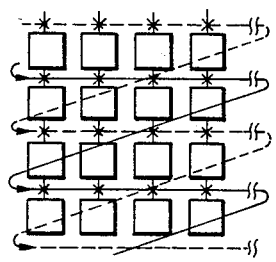
Figure 2C:
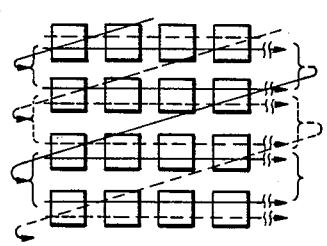
Figure 3:
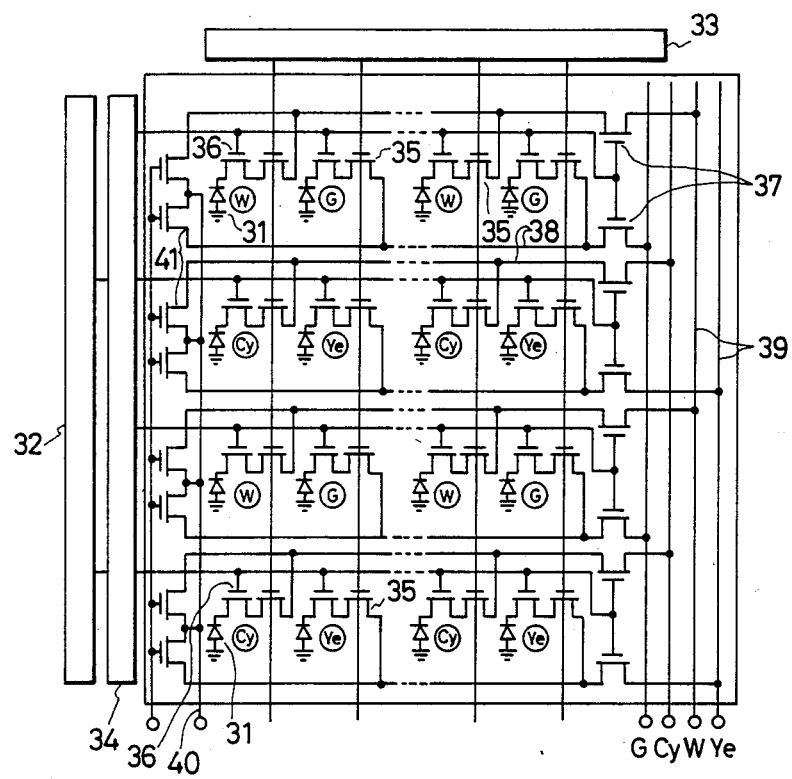
FIG. 3 shows the circuit construction of a conventional TSL solid-state image sensing device and the configuration of filters.
Figure 4:
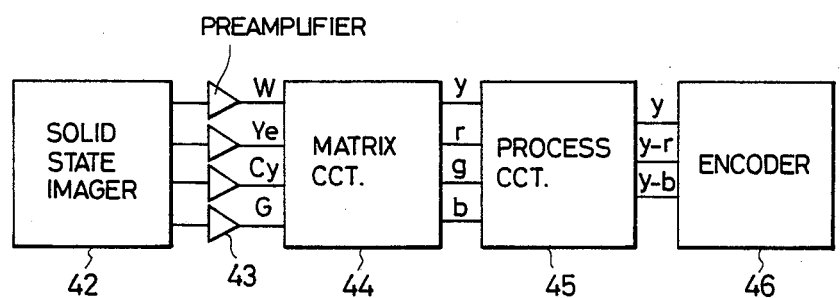
FIG. 4 shows a signal processing system of the conventional single-chip color solid-state imaging apparatus using the device shown in FIG. 3.
Figure 5:
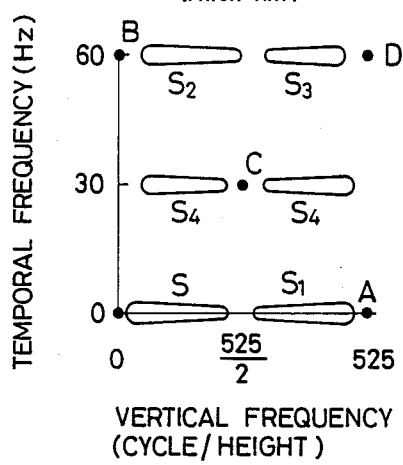
FIG. 5 shows a sampling frequency in a time-spatial region at the time of interlaced scanning and signal components of a picture when the image of a still picture is taken.
Figure 6A:
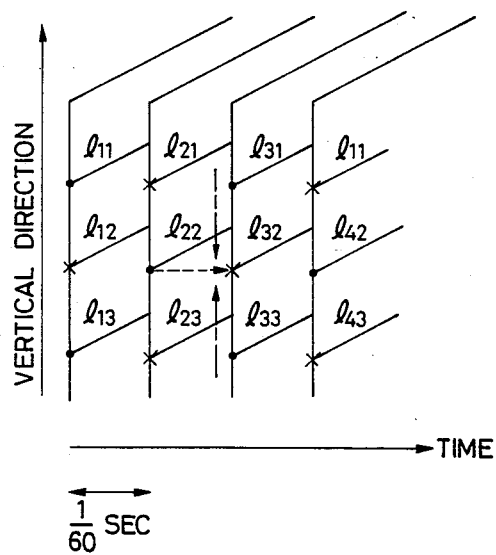
FIG. 6(a) shows an interpolation process for converting interlaced scanning, which is effected on the side of a receiver, to sequential scanning
Figure 6B:
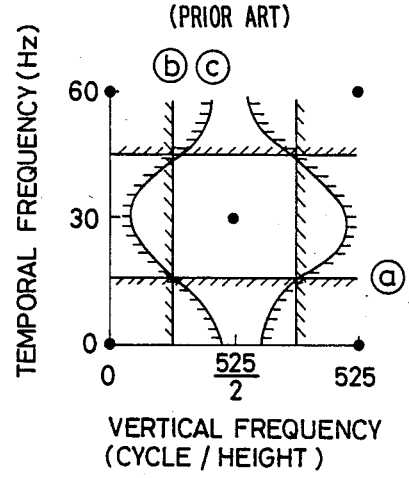
FIG. 6(b) shows characteristics of an interpolation filter.
Figure 8A:
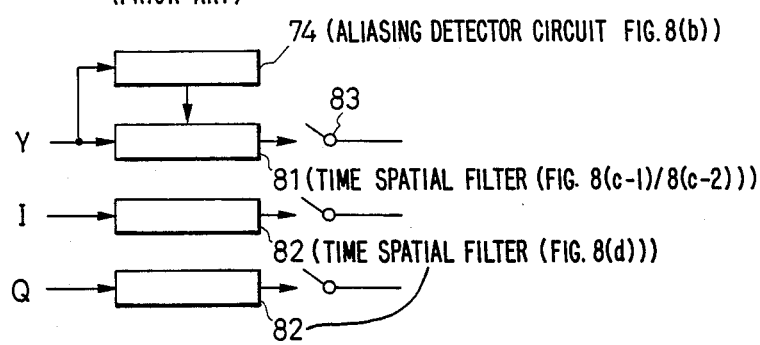
FIG. 8(a) shows a block diagram of the aliasing detector circuit and the motion-adaptive; scanning converter shown in FIG. 7 and FIGS. 8(b), 8(c), 8(c) and 8(d) show the characteristics of a pre-filter.
Figure 8A:
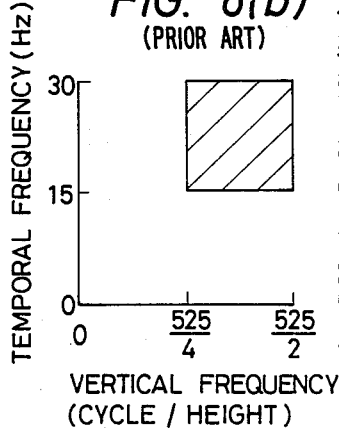
Figure 8B:
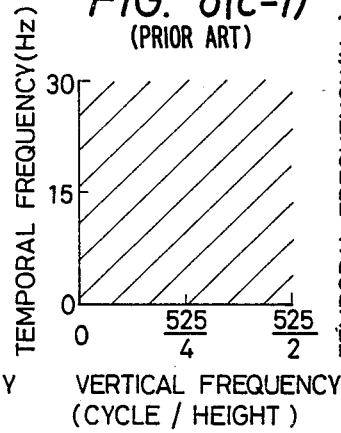
Figure 8B:
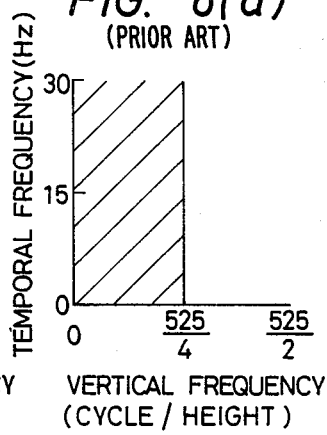
Figure 8D:
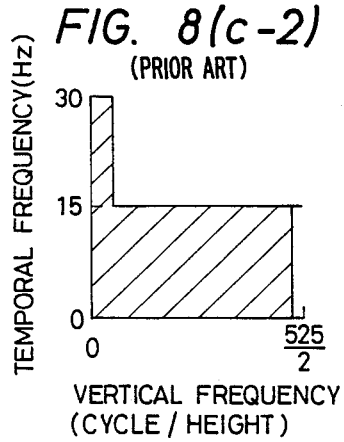

In FIG. 9, reference numeral 91 represents a TSL solid-state image sensing device for field store two-row readout in the same way as the device shown in FIG. 3 except for the filter configuration, and 92 represents a preamplifier for amplifying four device outputs. Reference numeral 93 represents a matrix circuit for generating two luminance signals $y_1$, $y_2$ and chrominance signals r, b from the outputs of the TSL solid-state image sensing device of two rows that are read out simultaneously but independently. Reference numeral 94 represents a process circuit for converting the luminance signals $y_1$, $y_2$ and the chrominance signals r, b to luminance signals $y_1$, $y_2$ and color difference signals y-r, y-b; 95 is a scanning converter for effecting scanning conversion for the luminance signals $y_1$, $y_2$ in the same way as the Y signal shown in FIG. 8; and 96 is an encoder for obtaining an NTSC composite signal from the y signals after scanning conversion and from the color difference signals y-r, y-b.

In FIG. 10 showing the filter configuration formed two-dimensionally on the solid-state image sensing device 91, symbols W, G, Cy and Ye represent spectral responsivity characteristics of the filters. In FIG. 11 which shows in detail the coefficients of the matrix circuit 93, each numeral value represents the coefficient for producing each of the luminance signals $y_1$, $y_2$ and the chrominance signals r, b by multiplication/addition of the output signals W, G, Cy, Ye of the pixels on which each color filter is disposed.

Hereinafter, the operation of the present apparatus will be described. The color signals W, Cy, Ye, G outputted from the solid-state image sensing device 91 are applied to the four amplifiers 92 and are amplified, respectively. The preamplifier output are applied to the matrix circuit 93 which effects multiply/add signal processing and are converted to two luminance signals y₁, y₂ and chrominance signals r, b in accordance with the following equation (2):

$$\left.\begin{array}{l} y_1 = W + 1.4G \\ y_2 = Ye + 1.4Cy \\ r = W + 0.8Ye - 0.7Cy - G \\ b = W - 0.8Ye + 1.6Cy - 1.5G \end{array}\right\} \quad (2)$$

The output of this matrix circuit is converted to the luminance signals y₁, y₂ and the color difference signals y-r, y-b by the process circuit 94. Here, the color difference signals are converted in accordance with the following equation (3):

$$\left.\begin{array}{l} y - r = y_1 + y_2 - r \\ y - b = y_1 + y_2 - b \end{array}\right\} \quad (3)$$

Thereafter, the luminance signals y₁, y₂ are subjected to motion-adaptive scanning line conversion in the same way as the luminance signal Y shown in FIG. 8 by the scanning converter 95 consisting of the motion detector 74 and the time-spatial filter 81 described with reference to FIG. 8 and turned to the interlaced scanning signal.

On the other hand, no treatment is applied to the chrominance signals because they have already been turned to the interlaced scanning signals when passing through the matrix circuit. The signals which have thus been converted to the interlaced scanning signals are changed to the NTSC signals by the encoder 96.

According to the embodiment described above, the sequential scanning signals suitable for the EDTV system can be obtained by merely producing the luminance signals from the two horizontal pixels but not from the four pixels in the imaging apparatus which are used for the existing television system. Moreover, since the chrominance signals are produced from a signal of two rows and the combination of these two rows is changed for each field, the chrominance signals of EDTV can advantageously be obtained immediately without the need of sampling.

Though the embodiment shown in FIG. 9 represents the example of the TSL solid-state image sensing device, any type of solid-state image sensing devices may be used so long as they are devices for field store two-row simultaneous readout. Examples of the devices of this kind include the MOS type device described in "ISSCC Gig. Tech. Papers", pp. 26–27, 1980, the MOS-CCD type device having an RANS circuit which is described in "IEEE Trans. Electron Devices", Vol. ED-32, pp. 1484–1489, Aug., 1985, and IL-CCD type device described in "J. Inst. Telev. Eng., Japan", 4–12(1087), pp. 85–86.

Figure 12A:
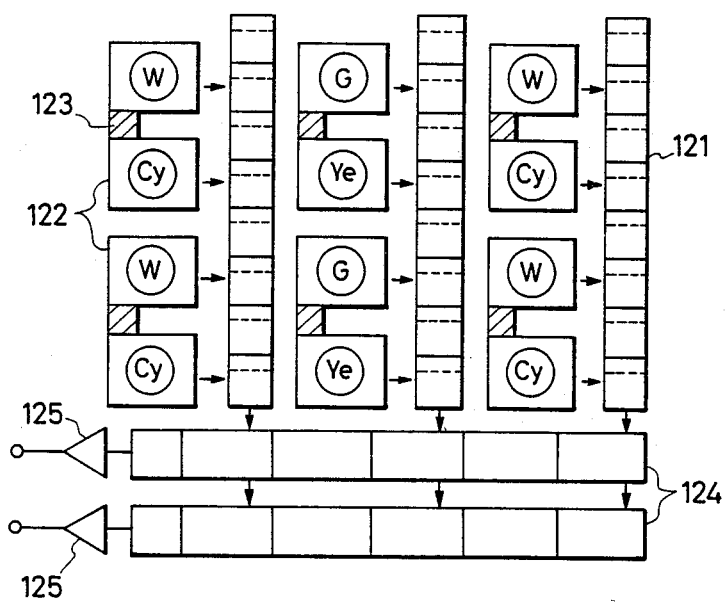
FIGS. 12(a) and 12(b) show the structure of another embodiment of the present invention and the circuit structure of the device used.
Figure 12B:
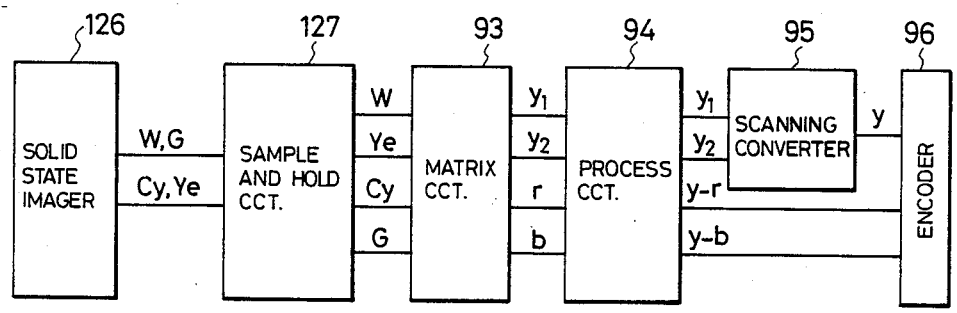

Next, the second embodiment of the present invention using the IL-CCD image sensing device will be described with reference to FIGS. 12(*a*) and 12(*b*). FIG. 12(i b) is a structural view of the solid-state imaging apparatus of the present invention and FIG. 12(*a*) is a circuit structural view of the solid-state image sensing device used for the apparatus shown in (b). In FIG. 12(*a*), reference numerals 121 and 124 represent vertical and horizontal CCDs for vertical and horizontal scanning, respectively; 122 is a photodiode; 123 is an overflow drain for discharging excessive charges in the photodiode; and 125 is an output amplifier. Symbols Ⓦ, Ⓖ, Ⓒy and Ⓨe represent the characteristics of the filter disposed on each pixel.

Next, the operation of this circuit will be described. The signal charges converted photoelectrically by the photodiodes 122 are transmitted to vertical CCD 121 during the vertical blanking period. Thereafter, two rows are separated in each horizontal blanking period, transferred to horizontal CCD 124 and outputted sequentially from the output amplifier 125 during the horizontal scanning period. There are two series of output signals: In the first one, W and G are repeated alternately while in the second one, Cy and Ye are repeated alternately. Incidentally, the combination of two rows is changed by changing the combination of two rows that are transferred from vertical CCD to horizontal CCD by changing the mode of application of external clocks.

In FIG. 12(*b*), reference numeral 126 represents the solid-state image sensing device shown in FIG. 12(*a*) and 127 does a sample-and-hold circuit for separating W from G and Cy from Ye. Reference numerals 93 to 96 represent the corresponding constituents of FIG. 9. The device output is separated to the four W, G, Cy and Ye signals through the sample-and-hold circuit 127 and then changed to the NTSC signals by signal processing in the same way as in FIG. 9.

Though the description given above deals with the solid-state image sensing device which effects field store two-row simultaneous readout, the number of rows to be read out simultaneously may be arbitrary so long as all the pixels are read out independently per field in the device.

Though the first and second embodiments described above deal with the case of signal processing where the filter configuration consists of the repetition of four W, Cy, Ye, G pixels and two luminance signals y₁, y₂ and color difference signals y-r, y-b are obtained by the device having such a filter configuration, any mode of color filters and signal processings may be employed so long as they can form the luminance signals from the signal output of each row.

Figures 13A, 13B, 14:
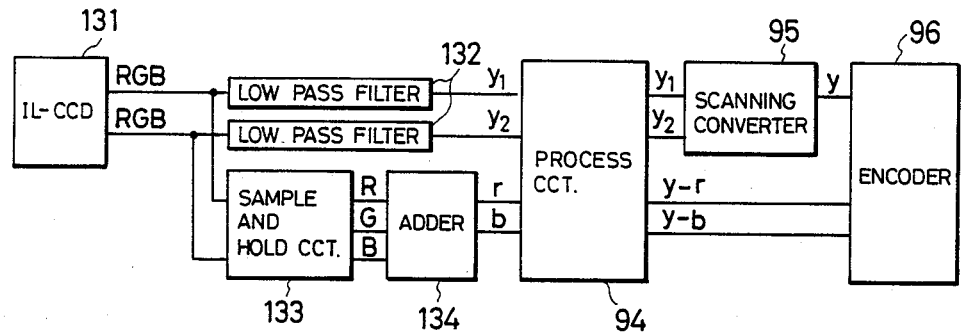
FIG. 13(a) shows the structure of still another embodiment of the present invention and FIG. 13(b) the filter configuration thereof.
FIG. 14 shows still another embodiment of the present invention.

FIG. 13(*a*) shows still another present invention using RGB stripe filters shown in FIG. 13(*b*). Reference numeral 131 presents IL-CCD shown in FIG. 12; 132 shows a pair of low-pass filters in the horizontal direction; 133 is a sample-and-hold circuit for separating RGB from the device output; 134 is an addition circuit for adding two rows of the separated RGB signals to obtain rb signals; and 94 to 96 are the same constituent as those of FIG. 9. The output of CCD 131 passes through a low-pass filter 132 in the horizontal direction for each row and becomes the luminance signals y₁, y₂. On the other hand, the R, G, B signals separated by the sample-and-hold circuit 133 are added by the adder 134 for two rows, changed to the r, b signals and thereafter inputted to the process circuit 94. Thereafter, they are changed to NTSC signals by signal processing in the same way as in FIG. 9. Since the luminance signals are formed by horizontal three pixels in this embodiment, horizontal resolution is lower than that of FIG. 12 but vertical resolution is equivalent to that of the first and second embodiments. Furthermore, FIG. 14 shows a G-checkered R/B line sequential filter used in still another embodiment of the present invention.

Since the present invention can accomplish an imaging apparatus capable of providing sequential scanning necessary for the EDTV system by use of a solid-state image sensing device having the same number of pixels in the vertical direction as the prior art devices, it provides the effect that a high quality single-chip color solid-state imaging apparatus can be obtained economically.

What is claimed is:

1. A solid-state color imaging apparatus having a plurality of photoelectric conversion means disposed two-dimensionally in rows and columns, each of said photoelectric conversion means having a spectral responsivity characteristic, the apparatus comprising:

scanning means for reading out a signal of each of said photoelectric conversion means corresponding to a charge accumulated therein as an independent signal in a field, scanning with respect to said field the same number of rows as that of a frame;

means for obtaining first intensity signals with respect to each one of said number of rows of a frame, wherein each of said first intensity signals corresponds to an intensity signal of each row, and is obtained only from the independent signals read out from each row;

means for obtaining second intensity signals corresponding to half the number of said first intensity signals by processing said first intensity signals; and means for encoding said second intensity signals, wherein said means for obtaining first intensity signals does so preforming a specified weighted summation of the independent signals read out from each row based on the spectral responsivity characteristics of the corresponding photoelectric conversion means.

2. A solid-state color imaging apparatus according to claim 1, wherein said scanning means simultaneously reads out independent signals from two adjacent rows of said photoelectric conversion means at a time.

3. A solid-state color imaging apparatus according to claim 2, wherein chrominance signals are generated from the independent signals read out from pairs of the rows of photoelectric conversion means, and wherein the pairs of rows are different for alternate fields.

4. A solid-state color imaging apparatus according to claim 1, wherein chrominance signals are generated from the independent signals read out from pairs of the rows of photoelectric conversion means, and wherein the pairs of rows are different for alternate fields.

5. A solid-state color imaging apparatus having a plurality of photoelectric conversion means disposed two-dimensionally in rows and columns, each of said photoelectric conversion means having a spectral responsivity characteristic, the apparatus comprising:

scanning means for reading out a signal of each of said photoelectric conversion means corresponding to a charge accumulated therein as an independent signal in a field, scanning with respect to said field the same number of rows as that of a frame;

means for obtaining first intensity signals with respect to each one of said number of rows of a frame, wherein each of said first intensity signals corresponds to an intensity signal of each row, and is obtained only from the independent signals read out from each row;

means for obtaining second intensity signals corresponding to half the number of said first intensity signals by processing said first intensity signals; and means for encoding said second intensity signals, wherein said second intensity signals does so by performing 2:1 subsampling of signals obtained by limiting the bandwith of the first intensity signals along a vertical temporal frequency.

6. A solid-state color imaging apparatus according to claim 5, wherein the bandwith of the first intensity signals is limited in accordance with the detection of aliasing components in said first intensity signals.

7. A solid-state color imaging apparatus having a plurality of photoelectric conversion means disposed two-dimensionally in rows and columns, each of said photoelectric conversion means having a spectral responsivity characteristic, the apparatus comprising:

scanning means for reading out a signal of each of said photoelectric conversion means corresponding to a charge accumulated therein as an independent signal in a field, scanning with respect to said field the same number of rows as that of a frame;

means for obtaining first intensity signals with respect to each one of said number of rows of a frame, wherein each of said first intensity signals corresponds to an intensity signal of each row, and is obtained only from the independent signals read out from each row;

means for obtaining second intensity signals corresponding to half the number of said first intensity signals by processing said first intensity signals; and means for encoding said second intensity signals, wherein said spectral responsivity characteristics of said photoelectric conversion means are such that a specified weighted summation of the independent signals read out from each row produces first intensity signals having a spectral content approximately equal to a luminance signal.

* * * * *